MOREAU & ROBERT.
Soap-Boiling.

No. 45,166. Patented Nov. 22, 1864.

Witnesses:
C. Kray
N. M. Lumpkin

Inventors:
F. Moreau
J. d. Robert

UNITED STATES PATENT OFFICE.

F. MOREAU AND F. ROBERT, OF NEW YORK, N. Y.

IMPROVEMENT IN THE MANUFACTURE OF SOAP.

Specification forming part of Letters Patent No. 45,166, dated November 22, 1864.

*To all whom it may concern:*

Be it known that we, F. MOREAU and F. ROBERT, of 57 Cedar street, in the city, county, and State of New York, have invented a new and useful Improvement in the Manufacture of Soap; and we do hereby declare that the following is a full, clear, and exact description thereof, which will enable others skilled in the art to make and use the same, reference being had to the accompanying drawings, forming part of this specification, in which—

Figure 1:
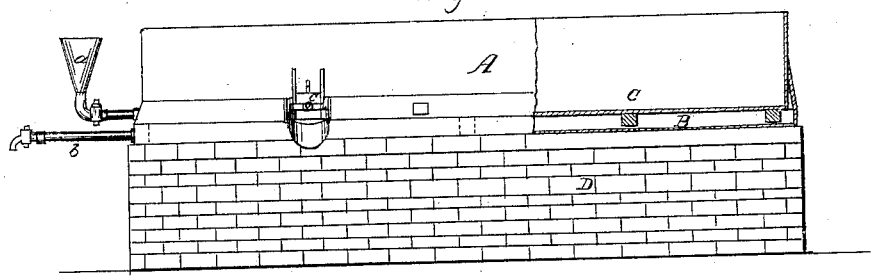
Figure 2:
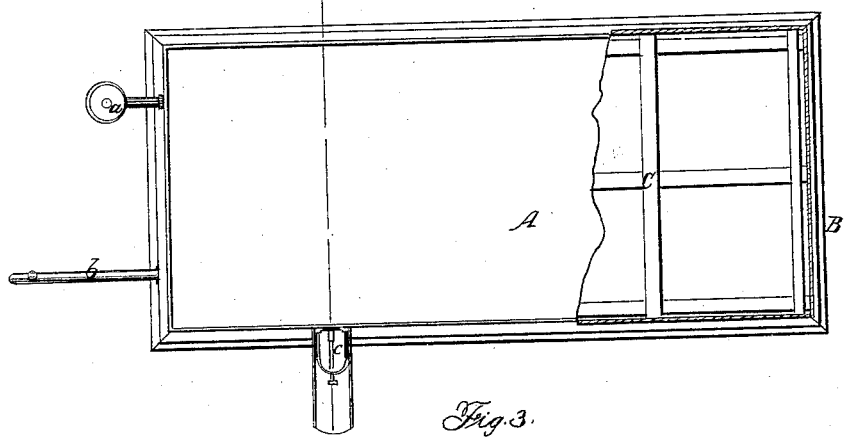
Figure 3:
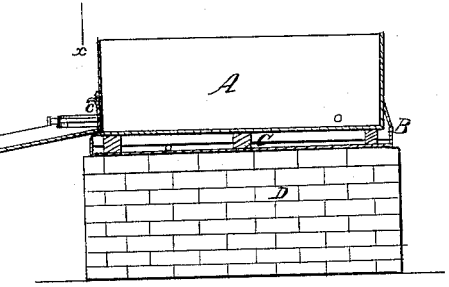

Figure 1 is a sectional side elevation of the apparatus used in carrying out this invention. Fig. 2 is a plan or top view of the same, partly in section. Fig. 3 is a transverse vertical section of the same, taken in the plane indicated by the line $x\ x$, Fig. 1.

Similar letters of reference indicate like parts.

This invention is based on the observation that oils which are kept for a certain time in badly-closed vessels assume a certain acidity and a bad odor, which proves that the same have absorbed a larger or smaller portion of oxygen, which can easily be shown by analysis. In this state they are designated by the name of rancid oils. The same change takes place with animal fats exposed to the open air or inclosed in badly-closed vessels. It has also been observed that even with the ordinary process of manufacturing soap fatty substances, after they have become rancid, have a much greater affinity for the alkali than before, and they combine with the same readily to form an acid fat or soap; but a great difficulty turns up—the acid fat retains the bad odor of the substance which has been used in its formation, and a soap is obtained which is unserviceable for consumption, because it imparts its odor to the clothes and to the skin. The great facility, however, with which the oxydized oil combines with alkali has induced us to seek for the means of profiting by said property, while the inconvenience of the odor is avoided. By introducing oxygen into the oil or fat we have succeeded to saponify the same in an hour or an hour and a half, according to the temperature existing with weak lyes, and without the aid of artificial heat, and we have produced in one operation four thousand (4,000) pounds of soap, whence it is obvious that the quantity produced is only limited by the capacity of the apparatuses employed. Finally, the operation of oxydizing the fats requiring time and certain precautions, we carry on the oxydization and the saponification simultaneously in the apparatus which we shall presently describe.

A large rectangular and flat pan, A, is placed into a second pan or jacket, B, and it is supported by an open frame, C, which is placed on the bottom of the jacket B. The jacket B is placed on a furnace, D, built up of brick or other suitable material, and it fits close to the outside of the pan A, as clearly shown in Fig. 1 and 3 of the drawings. The furnace is required when lard or tallow is used in the manufacture of soap, so that these materials can be kept in a liquid state. When oil is used no artificial heat is requisite. The jacket B is filled with water through the spout $a$ and the water withdrawn through the pipe $b$. A gate, $c$, in the side of the pan serves to remove the residuum after the soap has set. A cylindrical tub of sheet iron or other suitable material serves to prepare the lye, and the lye is obtained by dissolving soda in cold water. Ordinarily hot water is employed, but this process is defective, because it causes a loss of oxygen. Soda of any desirable description can be employed; but to avoid loss of time required to render the same caustic it is preferable to employ caustic sodas, such as are manufactured in France and England. The lye thus prepared and kept in readiness is used in equal quantity with the fat when the specific gravity is 24° of Baumé's alkalometer.

The saponification is carried on in the following manner: In the pan A a quantity of lard is placed—say two thousand (2,000) pounds—and made to melt at a gentle heat, generally about one hundred and thirty (130) degrees Fahrenheit. The fire is then withdrawn from the furnace, and two hundred (200) pounds of lye of twenty-four (24°) degrees are introduced, and the liquid is agitated continually. After the two hundred (200) pounds of lye have been absorbed, a second batch of two hundred (200) pounds is introduced, and so forth, the agitation being continued until the full quota of two thousand (2,000) pounds of lye have combined with the two thousand (2,000) pounds of lard, and a perfect mixture is effected in about two hours. By these means the saponification is effected in a short time, and if it is desired to make castile soap the product is subjected to the process of marbling.

By the continuous agitation the surface of the liquid is continually changed and all the particles are brought in contact with the atmosphere, the process being facilitated by the shape of the apparatus, which is extended and flat. The absorption of oxygen is sufficient, and it has the same effect as if it should be practiced previous to the saponification.

The depth of the liquid in the pan ought not to exceed eight (8) or ten (10) inches.

If the operation is conducted without proper agitation or in a deep pan, the result obtained is not satisfactory.

We claim as new and desire to secure by Letters Patent—

1. The within-described process of manufacturing soap by mixing lye with fat or oil oxydized either previous or during the saponification, substantially in the manner herein set forth.

2. The use, in the manufacture of soap, of an apparatus, substantially such as herein described, consisting of a flat pan, A, supported by a frame, C, in a steam-jacket, B, as set forth.

F. MOREAU,
FRED. ROBERT.

Witnesses:
M. M. LIVINGSTON,
C. KPRASS.